United States Patent [19]

Hebert

[11] Patent Number: 4,642,183
[45] Date of Patent: Feb. 10, 1987

[54] OIL FILTER

[76] Inventor: Alfred M. Hebert, P.O. Box 706, Pleasant Valley, N.Y. 12569

[21] Appl. No.: 841,038

[22] Filed: Mar. 21, 1986

[51] Int. Cl.⁴ ............................................ B01D 27/00
[52] U.S. Cl. ...................... 210/232; D23/4; 123/198 E; 210/168; 210/248; 210/440; 210/443; 210/541; 210/542; 210/DIG. 17
[58] Field of Search .................... D23/3, 4, 5, 149; 123/198 E; 210/168, 232, 238, 248, 440, 443, DIG. 17, 541, 542

[56] References Cited

U.S. PATENT DOCUMENTS

| | | | |
|---|---|---|---|
| 1,179,453 | 4/1916 | Paton | 123/198 E |
| 3,250,242 | 5/1966 | Pekarek | 210/DIG. 17 |
| 3,399,515 | 9/1968 | Hahl | 123/198 E |
| 3,929,643 | 12/1975 | Donaldson | 210/DIG. 17 |
| 4,045,349 | 8/1977 | Humbert | 210/232 |
| 4,376,703 | 3/1983 | Keauss | 210/238 |
| 4,451,368 | 5/1984 | Pandelena | 210/238 |
| 4,452,695 | 6/1984 | Schmidt | 210/232 |
| 4,452,697 | 6/1984 | Conrad | 210/DIG. 17 |
| 4,454,037 | 6/1984 | Conterio | 210/DIG. 17 |
| 4,501,660 | 2/1985 | Hebert | 210/168 |

OTHER PUBLICATIONS

J. C. Whitney & Co. Motorcycle Parts and Accessories Catalog No. 33B, 1984, p. 67.

*Primary Examiner*—Ernest G. Therkorn
*Attorney, Agent, or Firm*—Martin J. Spellman, Jr.

[57] ABSTRACT

A removable threaded oil filter adaptor collar and a removable outer decorative cover for an oil filter are disclosed.

3 Claims, 3 Drawing Figures

OIL FILTER

BACKGROUND OF THE INVENTION

Field of the Invention

The present invention relates to automotive lubrication oil filters.

It is well known that proper lubrication of automotive engines is perhaps the most critical routine step which can protect the engine from wear and greatly extend the useful life of the engine. Lubricating oil, besides performing its lubricating and cooling functions in the engine, serves to remove acids and other impurities as well as wear residues. They are conventionally removed by filtering elements through which the lubricating oil is continuously circulated and by replacing the lubricating oil with new oil at frequent intervals during the utilization of the engine.

My U.S. Pat. No. 4,501,660 relates to an oil filter element having within the central core of the filtering element a permanently magnetized metal bar and a helical structure of magnesium metal. The magent serves to remove metallic particles from the oil and the magnesium to neutralize sulfuric acid.

It is known that automotive sporting enthusiasts frequently use chromed or other customized decorative valve covers, air cleaners and chromed oil filter and other items to enhance the appearance of their vehicle's engine.

Since oil filters are an expandable, replaceable item, the present practice of chroming the outer cylindrical casing of the filter is very wasteful and expensive. Automotive filters presently on the market however do not permit the separate replacement of the filter unit from the casing.

An automobile parts store must now stock many differnt sizes of automotive filters to meet the demand of customers with different types of cars and engines all which have different sized filters with varying sized threaded elements for connection to the threaded conduit from the engine. This results in a great outlay to maintain minimum stock which often does not turnover very rapidly but must be maintained in order to satisfy customer demand.

The present invention provides an oil filter which can be manufactured in a limited number of sizes and my means of an adaptor neck, can be utilized on a variety of different type engines which in the past usually required oil filters specifically designed for them. The oil filter of this specification also includes an improved design for installing, maintaining, and changing the combination of magnetic bars and spiral magnesium helical structure or vice versa as disclosed in may above noted patent, U.S. Pat. No. 4,501,660.

Decorative covers for oil filters, in the past actually have been the outer container walls of the oil filter itself and, therefore, had to be discarded when it was time to change the filter.

The present invention provides an adaptor structure for simply putting the decorative cover easily and securely in place over the replacement oil filter without the need of any special tools in order to transfer from the old to the new replacement oil filter.

SUMMARY OF THE INVENTION

In accordance with the present invention a new and improved oil filter is provided which through its unique design can be adapted to is a variety of different engine sizes by the use of a specially designed threaded adaptor neck which enables a limited number of different sized filters to be installed on many different automotive engines.

This permits a great reduction in the present extensive numbers of sizes and designs of oil filters which must be stocked in automotive parts stores to meet the needs for replacement filters for the different model cars and engine sizes.

The usual automotive oil filter unit is constructed in the form of a cylindrical drum closed at one end with the other end having fittings for connecting to the automotive engine. The cylindrical sides are usually comprised of a light gauge stamped metal.

The adaptor unit of the present invention is comprised of a semi-cylindrical magnetic piece which fits about the can and is held to it by magnetism. The upper portion of this magnetic wrap-around structure is of a larger diameter and extends outwardly from the external walls of the can. A compressable expansion ring is inserted within the upper walls of the wrap-around structure to force the walls outwardly to engage the decorative cover which will slip across or around the outside walls and be held magnetically in place. Either a waffle-like spacer or resilient foam structure is inserted between the decorative can and the casing on the sides and at the base in order to form a more stable structure.

In addition, the filter of the present invention may be provided with an improved seating base for readily changing the insertable magnetic bars and helical structure of magnesium metal for scavenging metal particles and neutralizing sulfuric acid in the manner described in my above named patent U.S. Pat. No. 4,501,660 if included in the specific filter design.

Further, in accordance with the present invention, there is provided an adaptor structure for fitting a decorative cover such as a shiny polished chrome cover over the outside of the filter use and readily transferring the decorative cover to replacement filters an indefinite number of times.

With the replaceable helix containing the magnetic bars there is provided a rubber adaptor whereby the ends of the helical bar are placed therein and which rubber adaptor is seated in a corresponding annular depression in the oil filter bottom closure.

The adaptor being rubber, prevents any rattling and provides a firm seating of the magnet bars and magnesium helical, structure in place.

The helical, as indicated in my prior patent is formed with the upper end extending into the filter exit throat and larger than the internal opening of the pipe exiting the engine to prevent the helical structure and bar(s) from extending into the internal engine. The diameter however is less than that of the opening in the filter container itself in order to allow replacement or reuse of the magnetic bar and magnesium helical structure in replacement filters.

Thus, the filter of this invention is provided with an adaptor ring threaded externally and dimensioned to match the threads of the opening of the filter and internally according to the design of connecting conduit of the engine for which it is intended to be utilized. This adaptor ring thus will have a diameter and threads on the outside to match the filter and be of varying wall thickness and different thread design internally depending upon which engine it is intended to place the filter.

Thus it is possible to substantially standarize the size, design and capacity of the replacement filters and simply change the adaptor neck greatly reducing the stock of replacement filters that it is necessary to maintain to serve the varying demands of customers with different cars and engines.

Further embodiments of the filter of the present invention different sized annular gaskets to further increase the adaptability of a single filter structure to a variety of engine designs.

BRIEF DESCRIPTION OF THE DRAWING

In the accompanying drawings which form a part of the specification.

BRIEF DESCRIPTION OF AN ILLUSTRATED ENVIRONMENT

Figure 1:
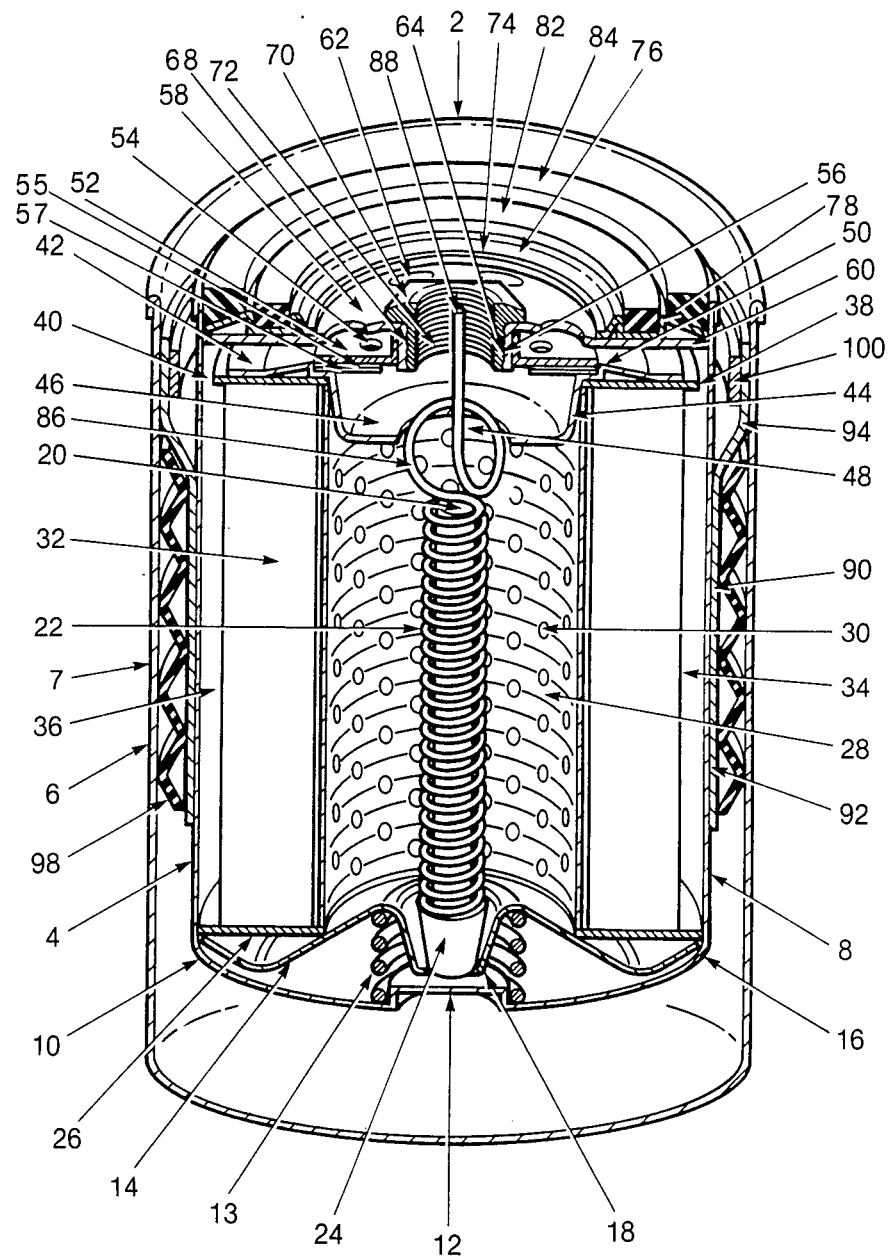
FIG. 1 is a cross sectional view of the filter device of the present invention showing the filter cartridge and the decorative cover and adaptor therefor.
Figure 2:
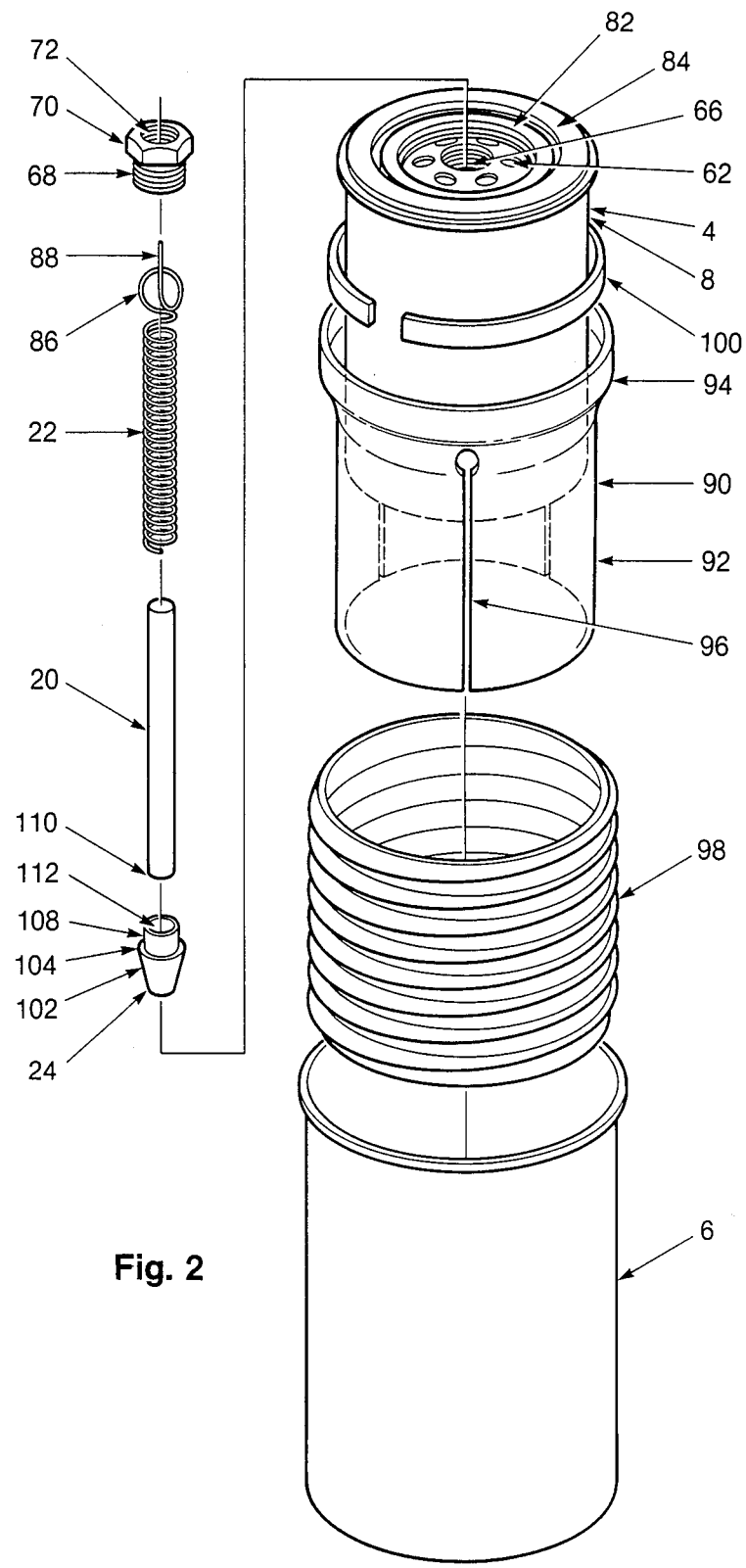
FIG. 2 is an expanded assembly drawing of the filter device of the present invention showing the separate components thereof individually.
Figure 3:
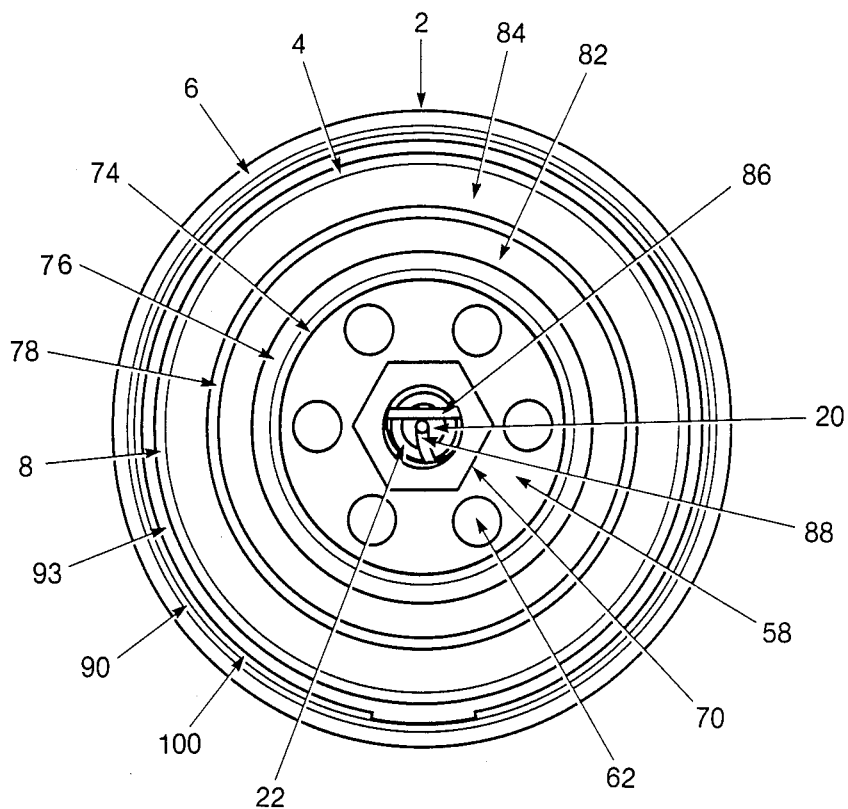
FIG. 3 is a top plan view of the filter device of the present invention.

Referring to the accompanying drawing, the filter device 2 of the present invention is comprised of the usual external filter cartridge 4 and in the present case is provided with a chromed, outer decorative cover 6 enclosing the filter cartridge 4 on the sides and the bottom thereof.

The filter cartridge 4 has cylindrical walls 8 and a domed base 10 with a central portion 12 thereof raised slightly to form a retainer for the spring 13 which biases the annular insert 14 upwardly. A centrally located annular well 18 is formed in the insert 14. The insert 14 extends outwardly into the corners 16 where the walls 8 and the base 10 of the cartridge 4 meet.

Resting in the annular well 18 is the unit structure of the magent bar 20 and magnesium helical 22 as described in further detail in my U.S. Pat. No. 4,501,660. The magnet bar 20 and magnesium helical 22 rest on a rubber cushioned retainer 24 described in further detail below. A ringed floor disc 26 rests on the bottom insert 14. Secured to this is the cylindrical perforated shell 28 having openings therein for the passage of the oil. The usual accordian filter element 32 is located outwardly of the perforated shell 28 and spaced as indicated at 36 from the outer cylindrical walls 8 of the the filter cartridge 4.

An annular flat ring 38 holds the filter element 32 in place at the top and is provided with openings 40 therein for the oil flow from the engine to the outside of the filter element 32 and then through the filter element 32 and through the perforated shell 28 and return to the engine. The top closure 42 is provided with the central depression 44 which secures the filter element 32 and the perforated shell 28 in place and extends downwardly to form the base 46 having an annular opening 48 therein of subsequent diameter to permit the changing or removal of the magnet bar 20 and magnesium helical 22 upon the replacement of the cartridge 4.

The rubber or other resilient material retainer 24 is also removable. A shoulder 50 formed in the closure 42 retains the perforated plate 52 which is fitted with the usual pressure relief valves 54. In the event that the filter element becomes clogged, the oil may flow through valves 54 and exit the filter cartridge 4 and return to the engine.

The relief valve 54 is simple in construction comprising a rubber leaf valve face 55 and leaf spring 57 as is well known.

The plate 52 has a central upstanding annular wall 56 formed therein which strengthens and supports the top closure 58 the edge of which is secured to the walls 8 of the filter cartridge 4 and is provided with openings 62 for entry of the lubricating oil from the automotive engine in the usual manner. The inner portion of the closure plate 58 has depending annular walls 64 formed therein with internal threads 56 corresponding to the external thread 68 of the adaptor 70. Adaptor 70 on its inner walls is provided with internal threads 72 which correspond to the threads of the engine to which the filter is to be attached.

In connection with the adaptor 70, the thickness of the walls 64 will vary according to the particular engine on which the filter cartridge 4 is to be installed. Thus, the same filter cartridge 4 may be used for a variety of engines simply by changing the dimensions or threads of the adaptor nut 70.

A retainer plate 74 is formed with an inner shoulder 76 and an outer shoulder 78. The outer edge of the retainer plate 74 bears on the upper portions of the inside face of the walls 8 of the cartridge 4. Secured thereto is annular inner gasket 82 between shoulder 76 and 78 and outer gasket 84 located between the shoulder 78 and the inside of outer wall 8 at the top thereof.

The helix 22 as the top turn thereof 86 formed with the outer diameter larger than the inner diameter of adaptor ring 70 in order to prevent it from possibly dislodging from the filter cartridge and going into the internal portions of the engine to which the filter cartridge 4 is attached. The extension 88 serves to maintain the proper location of the helix in the cartridge structure.

The filter device is provided with magnetized adaptor sleeve 90 of generally cylindrical form with lower annular walls 92 an out transition section 93 and a larger upper annular wall portion 94. Slots 96 are provided in order to allow it to resiliently grip the walls 8 of the cartridge 4. The external diameter of the upper portion 94 is dimensioned to match the inner diameter of the decorative chrome cover 6. An expansion ring 100 which is compressible serves to bias the magnetic sleeve 90 outwardly to assure contact with the decorative cover 6.

The lower wall portions 92 of the sleeve 90 are dimensioned to fit snuggly and to be able to expand over the outer surfaces of the cartridge walls 8. The fact that the adaptor ring 90 is magnetized also serves to magnitize the walls 8 of the cartridge 4 and to enhance removal of metallic fines from the lubricating oil, the fines adhering to the inner surface of walls 8 of the cartridge.

An accordjian shaped annular resilient spacer sleeve 98 is provided to insure additional snug cushioned fit. It is dimensioned to be slightly larger than the space between the lower portion 92 of the sleeve 90 and the walls 7 of the decorative cover. Alternatively, the space may be any foam rubber or any resilient material padding which will assure a snug fit and freedom from rattling.

The rubber cushioned retainer 24 which fits in the well 18 is in the form of an inverted frusto-conical shape 102 having an annular shelf or ledge 104 formed thereon on which the lower ring of the helical magnet 22 rests, and an cylindrical upwardly extending wall 108 formed therein in which the lower end 110 of the bar 20 is retained within the space 112. This serves to firmly locate the magnesium helical and magnet bar 20 structure in the center of the perforated shell 28 and to facilitate the insertion and removal of the magent and helical magnesium.

It is thus clear that the filter device of the present invention is adaptable to be used readily on many different types of engines without the necessity of a specific filter cartridge for a specific engine. Thus simply by providing a selection of adaptor nuts having an outer diameter and threads matching those on the filter cartridge but having walls 64 and inner threads 72 dimensioned to match particular engines and with the selection of two different sized gaskets it may be readily added and adapted for use on many different engines.

A further embodiment of the filter devise of the present invention permits the cartridge to be disposed of at oil changes without the necessity of throwing away the decorative cover 6 which may simply be slipped in the cartridge case and the magnetic adaptor sleeve 92 secures it to the cartridge with the resilient material 98 and expansion ring 100 providing additional security.

In addition, the retainer 24 in the embodiment utilizing the magnesium helix 22 and the magnetic bar 20 permits them to be removable and yet firmly secured in place. Because of the dimensioning of the upper helix, the closure plates and the adaptor, the device is retained within.

Although the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. In an oil filter cartridge having a central internally threaded receptacle for connection to a corresponding externally threaded conduit on an engine for return of filtered oil circulated through said filter and an annular gasket defining a pathway for oil from said engine to said filter, the improvement therein whereby said central threaded receptacle has removeably threaded thereto an adaptor collar with external threads matched those of said receptacle and internal threads corresponding with the threads of said externally threaded conduit of the engine to which said cartridge is to be connected whereby varying the thickness of said collar allows said cartridge to be used in different engines and wherein a decorative outer cylindrical cover is removeably secured to the outer walls of said cartridge by means of a magnetized generally cylindrically shaped sleeve, dimensioned to resiliently slide over the outer cartridge walls, said sleeve having upper walls of a larger diameter to match those of the decorative cover, and resilient spacer means between the lower walls of said sleeve and the walls of said decorative cover.

2. The improvement is claimed in claim 1 wherein an expansion ring biases said upper walls of said sleeve outwardly in contact with said decorative cover.

3. An improvement according to any one of claims 1 and 2 wherein said filter cartridge includes a magnetic metal bar and magnesium helix.

* * * * *